(12) United States Patent
Nissen et al.

(10) Patent No.: US 12,392,743 B2
(45) Date of Patent: Aug. 19, 2025

(54) SENSOR SYSTEM FOR MONITORING A POWDER HANDLING DEVICE, AND A POWDER HANDLING DEVICE COMPRISING SUCH A SENSOR SYSTEM

(71) Applicant: GEA Process Engineering A/S, Søborg (DK)

(72) Inventors: Kristian Ravnborg Nissen, Søborg (DK); Mads Hjertstedt, Søborg (DK); Jon Steffen Larsen, Søborg (DK); Andreas Jauernik Voigt, Søborg (DK)

(73) Assignee: GEA Process Engineering A/S, Søborg (DK)

( * ) Notice: Subject to any disclaimer, the term of this patent is extended or adjusted under 35 U.S.C. 154(b) by 155 days.

(21) Appl. No.: 18/036,747

(22) PCT Filed: Nov. 12, 2020

(86) PCT No.: PCT/DK2020/050308
§ 371 (c)(1),
(2) Date: May 12, 2023

(87) PCT Pub. No.: WO2022/100801
PCT Pub. Date: May 19, 2022

(65) Prior Publication Data
US 2023/0366845 A1    Nov. 16, 2023

(51) Int. Cl.
*G01N 27/04* (2006.01)
(52) U.S. Cl.
CPC .................. *G01N 27/045* (2013.01)

(58) Field of Classification Search
CPC .................................................. G01R 31/3183
See application file for complete search history.

(56) References Cited

U.S. PATENT DOCUMENTS

| | | |
|---|---|---|
| 4,823,071 A | 4/1989 | Ding et al. |
| 5,070,725 A | 12/1991 | Cox et al. |
| 5,497,101 A | 3/1996 | Fillion |
| 9,880,529 B2 * | 1/2018 | Girardeau, Jr. ........ G05B 15/02 |
| 2014/0299483 A1 | 10/2014 | Lloyd et al. |
| 2015/0059459 A1 | 3/2015 | Girardeau, Jr. |
| 2017/0184445 A1 | 6/2017 | Araki et al. |
| 2020/0007061 A1 * | 1/2020 | Frischen ................... G01L 3/10 |

FOREIGN PATENT DOCUMENTS

| | | |
|---|---|---|
| CN | 104101699 A | 10/2014 |
| CN | 106574881 A | 4/2017 |
| CN | 109570657 A | 4/2019 |
| EP | 0653606 A1 | 5/1995 |

(Continued)

*Primary Examiner* — Tung X Nguyen
(74) *Attorney, Agent, or Firm* — Flaster Greenberg P.C.

(57) ABSTRACT

The present invention relates to a sensor system for monitoring a powder handling device. The sensor system comprising an alternating electrical signal source electrically connectable to the powder handling device and a processing device. The processing device comprising a measuring device and a controller communicatively connectable to the measuring device. The controller is configured to receive measurement data from the measuring device and determine a phase difference between an input signal and an output signal based on the received measurement data.

14 Claims, 3 Drawing Sheets

(56) References Cited

FOREIGN PATENT DOCUMENTS

| | | | |
|---|---|---|---|
| EP | 1051601 | A1 | 11/2000 |
| EP | 2145847 | A2 | 1/2010 |
| EP | 2415697 | A1 | 2/2012 |
| GB | 2522293 | A | 7/2015 |
| JP | H02173558 | A | 7/1990 |
| KR | 20160022522 | A | 3/2016 |
| WO | 0033043 | A1 | 6/2000 |

\* cited by examiner

SENSOR SYSTEM FOR MONITORING A POWDER HANDLING DEVICE, AND A POWDER HANDLING DEVICE COMPRISING SUCH A SENSOR SYSTEM

CROSS-REFERENCE TO RELATED APPLICATIONS

This application is the 371 National Stage of International Application No. PCT/DK2020/050308, filed Nov. 20, 2020, the disclosures of which are incorporated herein by reference in their entireties.

TECHNICAL FIELD

The present invention relates to a sensor system for monitoring a powder handling device. The sensor system comprising an alternating electrical signal source electrically connectable to the powder handling device and a processing device. The processing device comprising a measuring device and a controller communicatively connectable to the measuring device.

BACKGROUND ART

Modern powder handling plants handling chemical, pharmaceutical, dairy or food products are required to process huge amount, tons upon tons, of powder constantly. Even though the through-put requirements for such plants are huge, the requirements for quality and sanitation are of corresponding magnitude, as these powders in many cases are targeted towards human consumption. Consequently, even small levels of contamination or even the suspicion that a batch has been contaminated will lead to a stop in production and batches already processed may be discarded. Furthermore, before the plant can start processing powder again the contamination source must be identified and rectified, thus leading to down time and a loss in production.

One source of contamination are the powder handling devices. The powder handling devices are in many cases fabricated from stainless steel, which is inert in relation to the powder processed and easy to clean, thus satisfying the sanitation requirement. However, sometimes surfaces of the powder handling devices are scraped or otherwise damaged, which may lead to metal shavings being mixed into the powder stream. An example of this is seen in rotary valves handling powder. Rotary valves consist of a rotor rotating within a housing, and during normal operation the rotor does not contact the housing. However, thermal expansion, worn bearings, incorrect assembly, tolerances, pressure from cleaning fluid, or powder being processed may all lead to the rotor contacting and/or scraping the interior of the housing. Currently, sensor systems have been developed for monitoring powder handling devices, a prior art sensor system is explained in more detail in relation to FIGS. 2a and 2b. However, these conventional sensor systems suffer from a low Signal to Noise Ratio (SNR). The low SNR leads to a higher risk of false alarms. During cleaning, cleaning fluids may lead to false positives, thus sometimes requiring the sensor system to be turned off during cleaning. Even powders may in some cases give rise to a false alarm. The false alarms may become such a nuisance that the sensor systems are turned off by operators, thus compromising the safety of a powder handling plant relying on the sensor systems. To avoid these false alarms, the collected data is sometimes filtered, however filtering away data runs the risk of filtering away contamination incidents from the data. Especially, brief contacts between the rotor and the housing risk being filtered away, and hence, there is a risk of contamination of the product goes unnoticed.

SUMMARY OF THE INVENTION

It is an object of the present invention to overcome these problems, and to provide a sensor system, which overcomes or at least alleviates the problems of the prior art.

In a first aspect of the invention, this and further objects are achieved with a sensor system for monitoring a powder handling device, wherein the sensor system comprises an alternating electrical signal source electrically connectable to the powder handling device and configured to generate an alternating electric signal, a processing device comprising a measuring device and a controller communicatively connectable to the measuring device, wherein the measuring device is electrically connectable to the powder handling device, and the alternating electrical signal source, wherein the measuring device is configured to collect measurement data on an input signal and an output signal, wherein the input signal is the alternating electric signal before it passes through the powder handling device, wherein the output signal is the alternating electric signal after it has passed through the powder handling device, wherein the controller is configured to receive the measurement data from the measuring device and determine a phase difference between the input signal and the output signal based on the received measurement data.

The phase difference between the input signal and the output signal depends on both the material within the powder handling device, e.g. cleaning fluid or powder, and the geometry of the powder handling device. Thus, by determining the phase difference a higher level of system information is obtained in comparison to conventional systems, thus leading to a lower amount of false alarms and lowering or even obsoleting the requirements on filtering the data. Furthermore, the sensor system according to the invention is not limited to monitoring only powder handling devices during operation. Since the phase difference gives information regarding the geometry of the powder handling device, newly fabricated powder handling devices may be measured on as a quality check, e.g. a baseline measurement of a quality assured powder handling device may be determined, and the baseline measurement may be compared directly or used for establishing a quality threshold for which measurements made on newly fabricated powder handling devices can be compared. Alternatively, or in combination, the sensor system can also be applied to check used powder handling devices to see if they still are of sufficient quality to be in use. The phase difference determined may also be used for further processing, e.g. for quantifying other parameters of the powder handling device such as an electrical impedance of the powder handling device or an electrical reactance of the powder handling device. The impedance or reactance may give further information regarding the geometry of the powder handling device and material being processed by the powder handling device.

In the context of this disclosure, the terms reactance and impedance are used interchangeably with the terms an electrical reactance and an electrical impedance, respectively.

The processing device is a device comprising any circuit and/or device suitably adapted to perform the functions described herein. The processing device may comprise general purpose or proprietary programmable microprocessors, such as Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof. A processing device may for example be a computer or other dedicated devices suitably adapted to perform the functions described herein. Preferably, the processing unit comprises a receiver, transmitter, and/or transceiver for wired or wireless communication.

The measuring device may be any suitable device for measuring one or more characteristics of an electric signal. The measuring device may measure one or more phase characteristics of an electric signal. The measuring device may be a clock or an oscilloscope. The measurement data collected by the measuring device may be converted from an analog format to a digital format via an analog-to-digital converter. Having the measurement data in a digital format may facilitate further processing of the data. The oscilloscope and clock may be standard components found embedded in most printed circuit boards.

The controller is a device comprising any circuit and/or device suitably adapted to perform the functions described herein. The controller may comprise general purpose or proprietary programmable microprocessors, such as Digital Signal Processors (DSP), Application Specific Integrated Circuits (ASIC), Programmable Logic Arrays (PLA), Field Programmable Gate Arrays (FPGA), special-purpose electronic circuits, etc., or a combination thereof. A controller may for example be a computer or other dedicated devices suitably adapted to perform the functions described herein. Preferably, the controller comprises a receiver, transmitter, and/or transceiver for wired or wireless communication. The controller may be configured to control operation of the powder handling device, e.g. turning on and off the powder handling device. Alternatively, or in combination, the controller may be configured to transmit a signal with information regarding the powder handling device to a central system, where an operator may peruse the information regarding the powder handling device, and dependent on the received information the operator may change an operation setting of the powder handling device.

The measuring device may be configured to transmit measurement data to the controller either wirelessly and/or through a wired connection. In some embodiments the measuring device and the controller are integrated in one unit.

The alternating electrical signal generated by the alternating electrical signal source may be a simple harmonic alternating current signal. Alternatively, the alternating electrical signal may be a square signal, triangular signal, a stepped signal, etc.

In the context of this disclosure a phase difference should be interpreted broadly. Thus, the phase difference may be any difference in phase between the input signal and the output signal. Consequently, the phase difference may be expressed as a phase angle or a time delay.

In an embodiment the sensor system comprises conditioning means, preferably a resistor with a predefined resistance, electrically connectable to the powder handling device and the alternating electrical signal source, wherein the output signal is the alternating electrical signal after it has passed through both the powder handling device and the resistor.

The conditioning means may be integrated into the processing device together with the controller and the measuring device. Alternatively, the conditioning means may be an add-on part external to the processing device. The conditioning means may function as a signal conditioner, thus giving freedom to modify the output signal by a known quantity, e.g. to improve SNR. Although a resistor is specifically mentioned other signal conditioners such as amplifiers, bridges, comparators or voltage followers may also be implemented.

In an embodiment the conditioning means are modifiable.

Being able to modify the conditioning means allows for modifying a measuring range and optimizing sensitivity, without having to remove or add additional conditioning means. Furthermore, the conditioning means may be modified while the powder handling device is in operation, thus allowing for on the fly adaptions of the sensor system. In embodiments where the conditioning means is a resistor, the resistor may have a modifiable resistance, which allows for the resistance of the resistor to be changed.

The conditioning means may be modified via a user input directly given to the conditioning means or via a device operationally connected to the conditioning means, e.g. the controller or a central hub configured to control operation of the powder handling device.

In an embodiment the controller is operationally connectable to the conditioning means, and the controller is configured to modify the conditioning means based on a comparison between the determined phase difference and a first threshold.

Consequently, a feedback loop is established between the conditioning means and the controller. The feedback loop may help in assuring that useful data is obtained without the need for user intervention. Consequently, the sensor system achieves a higher level of autonomy. For example, if the conditioning means is a resistor with a modifiable resistance the controller may be configured to modify the resistance of the resistor in response to the comparison between the determined phase difference and the first threshold.

The comparison may be to see if the determined phase difference exceeds or does not exceed the first threshold.

The first threshold may be a lower limit, an upper limit, or a range for the phase difference. In some embodiments the determined phase difference may further be used for determining a reactance and/or an impedance, in such embodiments the first threshold may be a lower limit, an upper limit, or a range for the impedance and/or the reactance. The first threshold may be determined based on baseline measurements. The baseline measurements may be measurements carried out in a controlled environment or during start-up of the powder handling device. By modifying the conditioning means, the phase difference may be amplified or otherwise changed to suit the operating conditions in order to give an optimized signal allowing for the controller to determine the phase difference. In some embodiments the controller may be configured to modify the conditioning means if the material to be processed by the powder processing device changes, e.g. a new powder with different intrinsic properties, or if cleaning fluid is to be introduced in the powder handling device. This may be especially advantageous for optimizing the sensitivity of the sensor system. In some embodiments the controller is configured to modify the conditioning means based on a comparison between the determined phase difference and a plurality of first thresholds. The plurality of first thresholds may be for defining different measurement ranges. The different ranges may relate to different sensitivities, thus allowing for a higher flexibility in modifying the conditioning means.

In an embodiment the controller is further configured to determine, based on the phase difference, a condition of the powder handling device and/or a condition of powder handled by the powder handling device.

A condition of the powder handling device may be whether the powder handling device is in a normal operating state, e.g. no scraping or irregular contact between parts of the powder handling device. The condition of the powder handling device may also be related to the state of wear the powder handling device, e.g. whether it is time for maintenance or replacement of the powder handling device or components hereof. In the case of a rotary valve the condition may relate to whether the rotor is contacting the housing of the rotary valve. A condition of the powder handled by the powder handling device may relate to a moisture level of the powder, a size of the powder grains, protein content, sugar content, fat content, powder temperature, or a powder flow rate. The determination of the condition of either the powder handling device and/or powder handled by the powder handling device may be carried out by observing whether a determined phase difference deviates by more than one, two or three standard deviations compared to a plurality of previous determined phase differences. The determination of the condition of either the powder handling device and/or powder handled by the powder handling device may be carried out by having one or more measurement ranges relating to different characteristics of the powder handling device and/or the powder handled by the powder handling device. The controller may be provided with a data storage for storing one or more reference and/or baseline measurements. The determination of the condition of either the powder handling device and/or powder handled by the powder handling device may be carried out by comparing the determined phase difference and/or a determined impedance and/or reactance to one or more reference and/or baseline measurements. The reference and/or baseline measurements may be one or more determined phase differences or impedances relating to a condition of either the powder handling device and/or powder handled by the powder handling devices, e.g. a reference measurement relating to the situation when cleaning fluid is introduced into the powder handling device, a reference measurement relating to scraping of the powder handling device, reference measurements relating to different moisture contents of powders being processed by the powder handling device, etc.

In an embodiment the controller is further configured to compare the phase difference to a second threshold, and output, based on the comparison, an operation signal.

The operation signal may be a stop signal. By outputting a stop signal quick precautions may be taken to limit negative effects caused by an unwanted event, e.g. scraping of the powder handling device or irregular operation. The operation signal may also be a signal outputted to control other parameters of the powder handling device, for example a power draw or one or more speed settings of the powder handling device. The operation signal may be outputted to one or more device, e.g. the operation signal may be outputted to devices around the powder handling device. The operation signal may be outputted and stored in a database and used for further processing. If the operation signal is stored in a database, it may be used for machine learning and/or developing a training dataset for the controller of the powder handling device and/or other controllers of other powder handling devices.

The comparison may be to see if the determined phase difference exceeds or does not exceed the second threshold.

The second threshold may be a lower limit, an upper limit, or a range for the phase difference. In some embodiments the determined phase difference may further be used for determining a reactance and/or an impedance, in such embodiments the second threshold may be a lower limit, an upper limit, or a range for the impedance and/or the reactance. The second threshold may be determined based on reference measurements or baseline measurements. The baseline measurements may be measurements carried out in a controlled environment or during start-up of the powder handling device. The operational signal outputted may be received by an alarm device capable of producing an alarm, e.g. a high sound and/or blinking light. The operational signal may be outputted to a device capable of controlling operation of the powder handling device, the device may then stop operation of the powder handling device or change process parameters of the powder handling device when receiving the operation signal. The controller may also output the operation signal directly to the powder handling device.

In an embodiment the controller is configured to determine an amplitude change between the input signal and the output signal based on the received measurement data.

The amplitude change between the input signal and the output signal may give additional information regarding the state of the powder handling device and/or material handled by the powder handling device. The amplitude change may give information regarding the resistance of the powder handling device. The amplitude change determined may further be processed in order to determine an impedance of the of the powder handling device. The amplitude change determined may be used for determining a condition of the powder handling device and/or powder handled by the powder handling device. The amplitude change may be used in conjunction with the determined phase difference for determining a condition of the powder handling device and/or powder handled by the powder handling device.

In an embodiment the controller is further configured to determine whether the amplitude change has exceeded a third threshold, and output, if the amplitude change exceeds the threshold, an operation signal.

The third threshold may be a lower limit, an upper limit, or a range for the amplitude change. In some embodiments the determined amplitude change may further be used for determining a reactance and/or an impedance, in such embodiments the third threshold may be a lower limit, an upper limit, or a range for the impedance and/or the reactance. The third threshold may be determined based on reference measurements or baseline measurements. The baseline measurements may be measurements carried out in a controlled environment or during start-up of the powder handling device.

In an embodiment the alternating electrical signal source generates the alternating current signal with a predefined frequency and amplitude, and wherein the predefined frequency and amplitude is modifiable by the alternating electrical signal source.

Having the alternating electrical signal being modifiable allows for a higher degree of freedom, consequently the generated alternating electrical signal may be generated to fit the present situation. In some embodiment it is also imaginable that the controller forms a feedback loop with the alternating electrical signal source, thus allowing the controller to modify the alternating electrical signal generated to optimize the collected measurement data. The controller is in some embodiments operationally connected to both the alternating electrical signal source and a modifiable resistor, thus the controller may modify the signal generated and the conditioning of the signal.

In an embodiment the powder handling device is a rotary valve comprising a rotor and a housing, wherein the rotor comprises a rotor shaft defining an axial direction and a radial direction, the rotor further comprises a plurality of vanes connected to the rotor shaft and extending radially from the rotor shaft, wherein the rotor shaft and the plurality of vanes are configured to rotate around a rotation axis parallel with the axial direction within the housing without contacting the housing.

Even though the sensor system may be suitable for a rotary valve, the sensor system is not limited to rotary valves. The sensor system may be used in conjunction with augers, simple pipe sections, blenders, mils, or any other powder handling device. In some embodiments the sensor system may also be used in conjunction with non-conducting powder handling device, e.g. a polycarbonate pipe. In such embodiments the sensor system may be provided with conducting plates, which may be mounted on an exterior of the non-conducting powder handling device. The conducting plates are then electrically connected to the sensor system. Thus, the conducting plates and the non-conducting powder handling device may be modelled as a capacitor. Consequently, allowing the sensor system to measure a phase difference over the non-conducting powder handling device in a way that is non-destructive, or non-invasive, with respect to the powder and/or powder handling device.

In a second aspect of the invention, a powder handling device comprising a sensor system according to the first aspect of the invention is provided.

In an embodiment the powder handling device is a rotary valve comprising a rotor and a housing, wherein the rotor comprises a rotor shaft defining an axial direction and a radial direction, the rotor further comprises a plurality of vanes connected to the rotor shaft and extending radially from the rotor shaft, wherein the rotor shaft and the plurality of vanes are configured to rotate around a rotation axis parallel with the axial direction within the housing without contacting the housing, wherein the alternating electrical signal source is electrically connected to the rotor and the housing, and wherein the measuring device is electrically connected to the rotor and the housing.

In an embodiment the rotor shaft is rotatably mounted to the housing by insulating bearings or insulating sleeves.

In a third aspect of the invention a method for monitoring a powder handling device is provided, the method comprises the steps of providing a powder handling device according to the second aspect of the invention, generating, by the alternating electrical signal source the alternating electrical signal, collecting, by the measuring device, measurement data on the input signal and the output signal, and determining, by the controller, a phase difference between the input signal and the output signal.

In an embodiment the steps of the method are performed during operation of the powder handling device.

It is noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF DRAWINGS

In the following description embodiments of the invention will be described with reference to the schematic drawings, in which.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness.

Figures 1A, 1B:
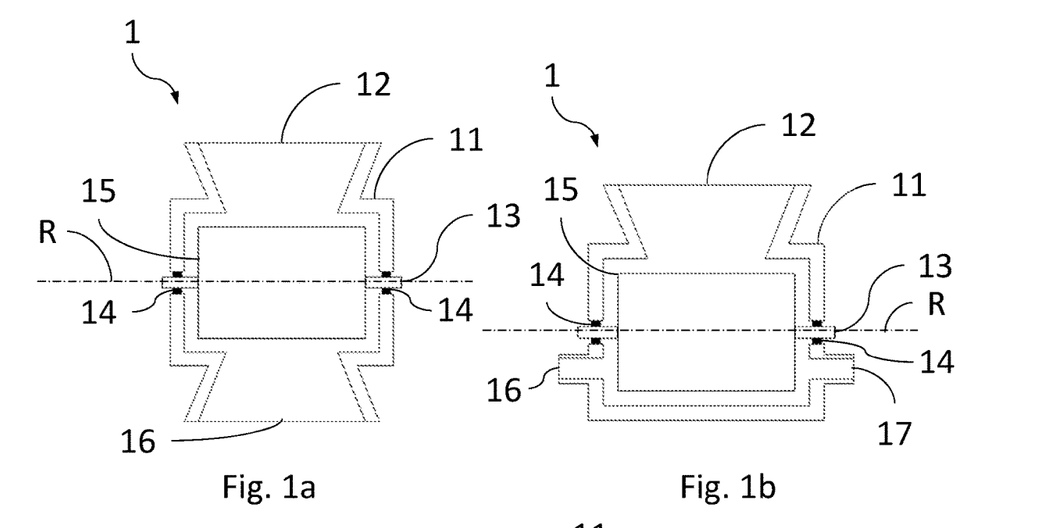
FIGS. 1a and 1b are schematic cross-sectional views of two different powder handling devices, more specifically rotary valves.

Referring initially to FIGS. 1a and 1b, two different rotary valves 1 are shown. Both rotary valves 1 comprise a housing 11. The housing 11 is typically made of stainless steel, but other suitable materials are conceivable. An inlet 12 is formed in a section of the housing 11, the inlet 12 being for receiving a powder stream into the interior of the housing 11. The inlet 12 may as shown take the form of a funnel 12. The inlet 12 may also be an opening in the housing 11 connected to a hopper or similar. In this embodiment, the inlet 12 is formed in a top section of the housing 11, thus allowing powder to fall into the housing 11. Within the housing 11 is placed a rotor. The rotor comprises a rotor shaft 13 defining an axial direction and a radial direction, the rotor further comprises a plurality of vanes 15 connected to the rotor shaft 13 and extending radially from the rotor shaft 13. The rotor shaft 13 and the plurality of vanes 15 are configured to rotate around a rotation axis R parallel with the axial direction within the housing 11 without contacting the housing 11. The vanes 15 are normally arranged so a gap is formed between the housing 11 and the vanes 15, the gap is preferably so small it hinders passage of powder. The vanes 15 defines compartments for receiving powder from the inlet 12. The vanes 15 and the rotor shaft 13 are set to rotate at a speed, low enough to ensure a spark is not created if the vanes 15 come into contact with the housing 11. The rotor is here connected to the housing via an insulating connection 14. The insulating connection 14 may be insulating bearings or an insulating sleeve. In the shown embodiment the rotor shaft 13 is connected to the housing 11 via the insulating connection 14. An outlet 16 is formed in a section of the housing 11. In the embodiment shown, the outlet 16 is formed in a bottom section of the housing 11, thus allowing powder to exit the housing 11 by falling through the housing. In the rotary valve shown FIG. 1a the outlet 16 is formed directly opposite of the inlet 11, where both the inlet 11 and the outlet 16 allow passage of powder in a direction perpendicular to the rotation axis R. However, FIG. 1b shows a different embodiment where the outlet 16 is not formed directly opposite of the inlet 11. In FIG. 1b the inlet 11 allows passage of powder in a direction perpendicular to the rotation axis R and the outlet 16 allows passage of powder in a direction parallel to the rotation axis R. Furthermore, an additional inlet 17 is formed in the housing 11. The additional inlet 17 allows for a stream of air being introduced into the housing. The stream of air is intended for being for blowing powder into the outlet 16.

Figure 2A:
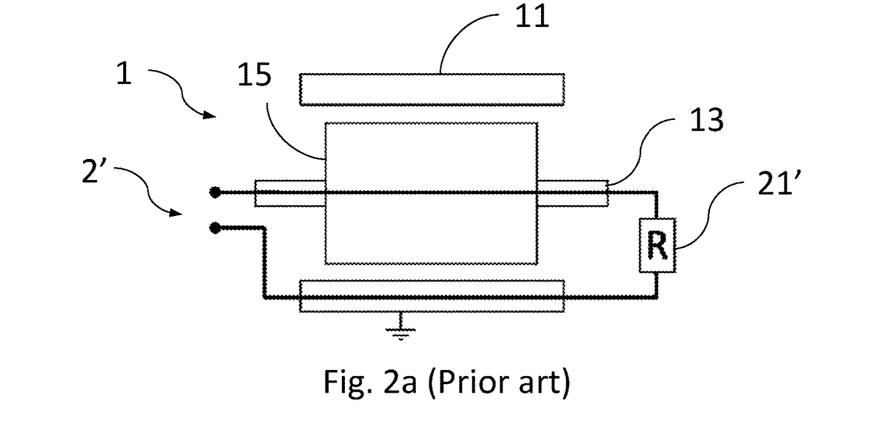
FIGS. 2a and 2b are schematic cross-sectional views of a powder handling device provided with a prior art sensor system in two different states.
Figure 2B:
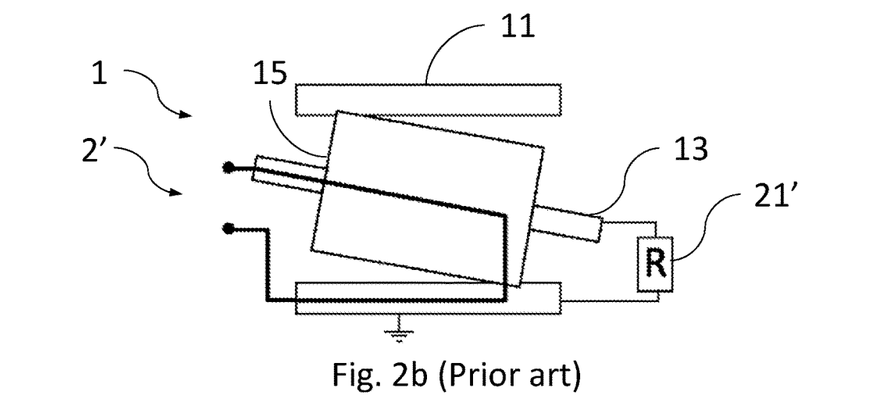

Referring to FIGS. 2a and 2b, schematic cross-sectional views of a powder handling device 1 provided with a prior art sensor system 2' in two different states are shown. In a first state, shown FIG. 2a, the powder handling device is in normal operation. In the first state the prior art sensor system 2' provides a direct current which passes through the rotor and the housing 11 of the powder handling device 1 in addition to a resistance R. In a second state, shown FIG. 2b, the powder handling device 1 is in an abnormal state where the vanes 15 of the rotor contacts the housing 11. In the second state the prior art sensor system 2' provides a direct current which passes through the rotor and the housing 11 of the powder handling device 1, however the resistance R is short circuited because of the contact between the vanes 15 and the housing 11. Thus, by monitoring the direct current in the prior art sensor system 2' it is possible to determine whether the resistance R is being short circuited. However, the direct current supplied is of a small magnitude to avoid charging any components which in return may lead to sparks being produced, which may be disastrous when handling powders. The small magnitude of the direct current leads to a low SNR, which may lead to false alarms or real alarms being filtered away.

Figure 3:
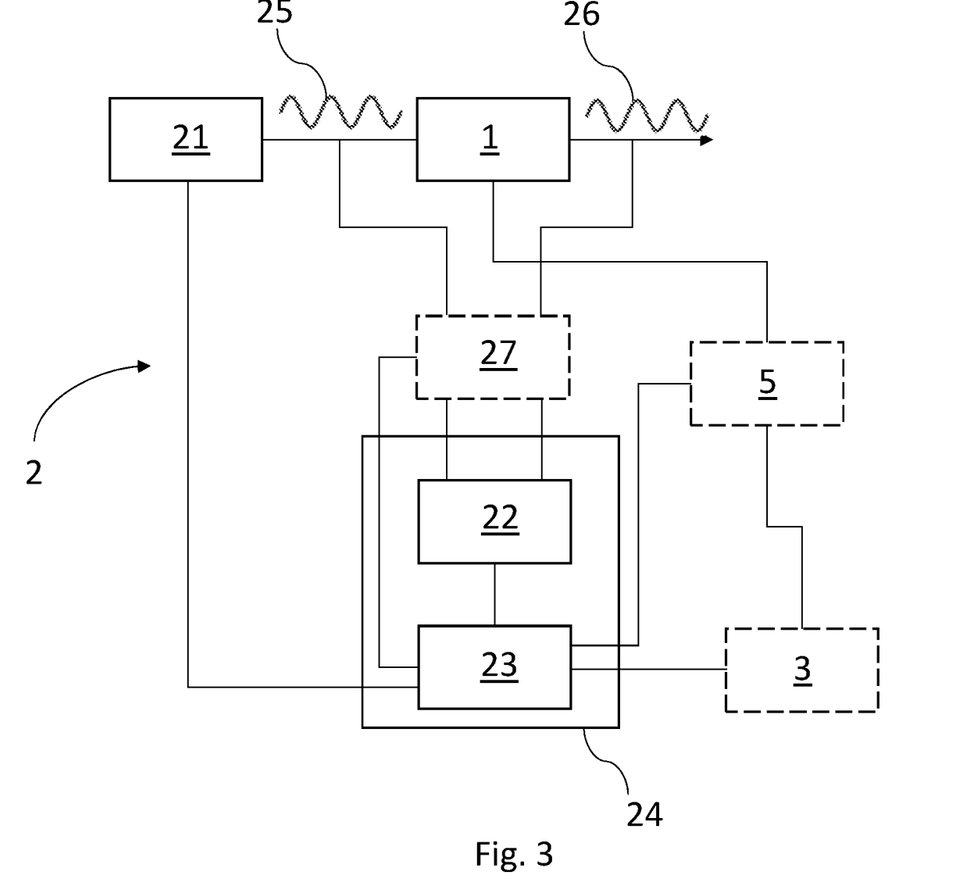
FIG. 3 is a block diagram of a powder handling device provided with a sensor system according to an embodiment of the invention.

Referring to FIG. 3, a schematic block diagram of a powder handling device 1 provided with a sensor system 2 according to an embodiment of the invention is shown. The sensor system 2 comprises an alternating electrical signal source 21. The alternating electrical signal source 21 is electrically connected to the powder handling device 1 and configured to generate an alternating electrical signal. The electrical signal source 21 is configured to generate an alternating electrical signal with a predefined frequency and amplitude. Preferably, the predefined frequency and amplitude is modifiable by the alternating electrical signal source, thus allowing the alternating electrical signal source to send out a wide variety of alternating electrical signals. Electrically connected to the powder handling 1 device, and the alternating electrical signal source 21 is a measuring device 22.

The measuring device 22 is comprised in a processing device 24. The measuring device 22 is configured to collect measurement data on an input signal 25 and an output signal 26. The input signal 25 is the alternating electrical signal before it passes through the powder handling device 1. The output signal 26 is the alternating electrical signal after it has passed through the powder handling device 1.

The processing device 24 further comprises a controller 23 communicatively connected to the measuring device 22. The controller 23 is configured to receive the measurement data from the measuring device 22 and determine a phase difference Δt between the input signal 25 and the output signal 26 based on the received measurement data. The sensor system 2 further comprise conditioning means 27 for conditioning the input signal 25 and/or the output signal 26. In the shown embodiment the conditioning means 27 is a resistor 27 electrically connected to the powder handling device 1 and the alternating electrical signal source 21. However, in other embodiments the conditioning means 27 may be one or more for the following: a filter, an operational amplifier, a resistor, a signal converter, an attenuator, a comparator, a voltage follower or a surge protector. In some embodiments the output signal 26 is the alternating electrical signal after it has passed through both the powder handling device 1 and the resistor 27. In some embodiments the input signal 25 is the alternating electrical signal before it has passed through both the powder handling device 1 and after it has passed through conditioning means 27. The input signal 25 and the output signal 26 may pass through the same conditioning 27 means or different conditioning means. The output signal 26 may have a first set of conditioning means associated with it. The input signal 26 may have a second set of conditioning means associated with it. The first set of conditioning means and the second set of conditioning mean may the same set of conditioning means or different sets of conditioning means. The resistor 27 has a predefined resistance. The predefined resistance of the resistor 27 is a modifiable resistance. The controller 23 is operationally connected to the resistor 27, i.e. the controller can control operation of the resistor 27. The controller 23 is configured to modify the resistance of the resistor 27 based on a comparison between the determined phase difference Δt and a first threshold.

The conditioning means 27 may in some embodiments be comprised in the processing device 24. In other embodiments the conditioning means 27 may be provided as a unit separate from the processing device 24. The controller 23 is operationally connectable to the alternating electrical signal source 21, i.e. the controller can control operation of the alternating electrical signal source 21. Consequently, the controller may control a frequency, and/or an amplitude of an electrical signal generated by the alternating electrical signal source 21. The controller 23 may be configured to control operation of the alternating electrical signal source 21 in response to a determined phase difference exceeding a threshold. The controller 23 may be configured to determine, based on the phase difference Δt, a condition of the powder handling device 1 and/or a condition of powder handled by the powder handling device 1. The controller 23 may be configured to compare the phase difference to a second threshold, and output, based on the comparison, an operation signal. The controller 23 may be configured to determine an amplitude change between the input signal and the output signal based on the received measurement data. The controller 23 may further be configured to compare the amplitude change to a third threshold, and output, based on the comparison, an operation signal.

The controller 23 in the shown embodiment is communicatively connected to an external sensor 5. An external sensor 5 is in the shown embodiment configured to collect measurement data on the powder handling device 1. The measurement data collected by the external sensor 5 may be regarding a temperature or a power consumption of the powder handling device 1. The data collected by the external sensor 5 may be correlated with the measurement data collected by the measuring device 22, in order to achieve a more precise sensor system 2. The external sensor 5 may alternatively be configured to collect data on an environment in which the powder handling device 1 is placed. The environmental data may be an air temperature or a moisture content of air. The external sensor may be one or more of the following: an accelerometer, a thermal sensor, an encoder, a tachometer, a microphone, a strain gauge, a current measurement sensor, or a torque sensor. The external sensor 5 is also communicatively connected to an external device 3.

The controller 23 in the shown embodiment is communicatively connected to the external device 3. The external device 3 may be an alarm device capable of outputting an alarm in response to receiving a stop signal from the controller 23. The external device 3 may be a central hub controlling operation of a plant or at least part of the plant, thus if the controller 23 outputs the operation signal the central hub may receive the operation signal and in return stop or change the operation of the powder handling device 1 and, if necessary, other surrounding equipment in the plant. The external device 3 may be a display for displaying the determined phase difference and/or other collected measurement data.

Figure 4:
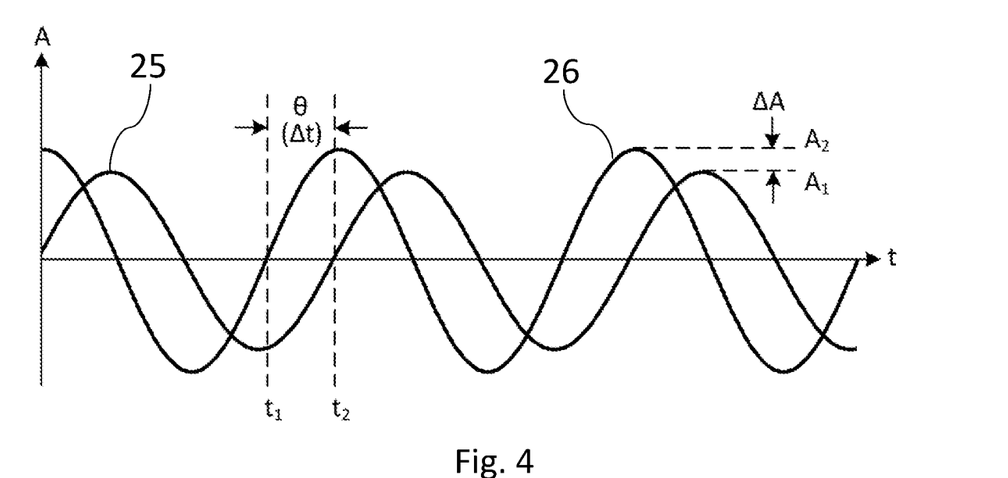
FIG. 4 is a graph showing amplitude versus time for an alternating electrical input signal and an alternating electrical output signal.

Referring to FIG. 4, a graph showing amplitude versus time for an alternating electrical input signal 25 and an alternating electrical output signal 26 is shown. The two alternating electrical signals 25 and 26 has the same frequency. However, since the output signal 26 has passed through the powder handling device 1 and maybe signal conditioning means 27 a phase difference $\Delta t$ and an amplitude difference $\Delta A$ is present between the input signal 25 and the output signal 26. The phase difference $\Delta t$ and the amplitude difference $\Delta A$ is dependent on the powder handling device 1, material being processed by the powder handling device 1 and maybe signal conditioning means 27.

Figure 5:
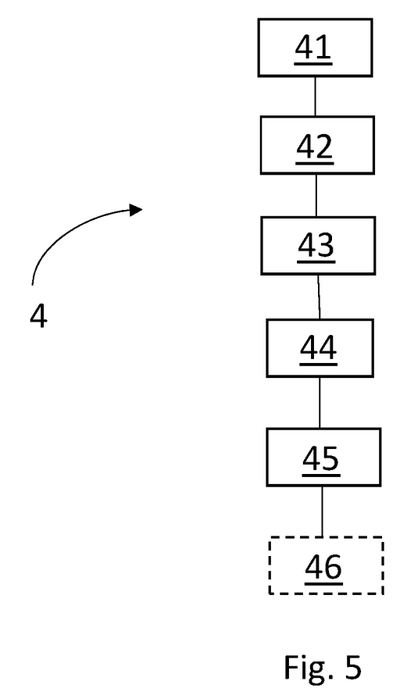
FIG. 5 is a block diagram of a method according to an embodiment of the invention.

Referring to FIG. 5, a block diagram of a method 4 according to an embodiment of the invention is shown. The method 4 comprises four steps. In a first step 41 a powder handling device 1 with a sensor system 2 according to an embodiment of the invention is provided. In a second step 42 an alternating electrical signal is generated by the alternating electrical signal source 21. In a third step 43 measurement data on the input signal and the output signal is collected by the measuring device 22. In a fourth step 44 the phase difference $\Delta t$ between the input signal 25 and the output signal 26 is determined by the controller 23. The steps of the method 4 may be performed during operation of the powder handling device 1 provided, thus allowing real time monitoring of the powder handling device 1. In some embodiments the method further comprises a sixth step 46, where the measurement data is further processed. The further processing of the measurement data may be in order to determine an impedance or a reactance of the system. The further processing of the measurement data may be to use the data in a neural network or for machine learning purposes. The further processing of the measurement data may be to generate an operation signal for the powder handling device or other surrounding devices on the basis of the measurement data. The further processing of the measurement data may be to determine a condition of the powder handling device and/or powder handled by the powder handling device. In some embodiments, the steps of the method is repeated over a period of time, e.g. days, weeks, months or years, allowing for the collection of measurement data over a period of time, thus allowing an operator or a dedicated processing unit to analyse temporal changes regarding either the powder handling device 1 or powder handled by the powder handling device 1. In some embodiments, the steps of the method 4 is performed on newly fabricated powder handling devices, thus allowing to check if the newly fabricated powder handling devices are of sufficient quality.

Figure 6:
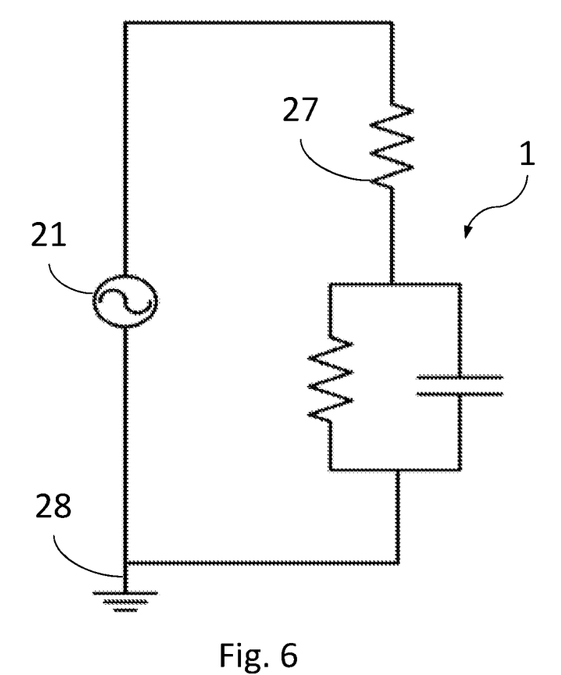
FIG. 6 is a circuit diagram of a rotary valve in electrical connection with an alternating electrical signal source and conditioning means.

Referring to FIG. 6, a circuit diagram of an embodiment of a powder handling device generally designated 1 is shown. In the following, the powder handling device will be referred to as a rotary valve 1 but the invention is equally applicable to other powder handling devices as well. The rotary valve 1 is in electrical connection with an alternating electrical signal source 21 and conditioning means 27 is shown. The conditioning means 27 in the circuit diagram is a resistor 27 with a modifiable resistance. The circuit is shown to have a ground 28. The sensor system may also comprise a ground 28. The ground 28 provides a fixed reference point for the input signal 25 and the output signal 26. The ground 28 may also help in assuring no charge is built-up in the powder handling device 1, thus lowering the risk of a spark being created because of a built-up of charge. From experimental data it has been found that a rotary valve 1 can in an electric circuit roughly be modelled as a resistor in parallel connection with a capacitor. The total impedance of the circuit shown FIG. 6 may be expressed as $$Z_{tot}=Z_{Rm}+Z_{RV}$$

where $Z_{Rm}$ is the impedance of the resistor 27 and $Z_{RV}$ is the impedance of the rotary valve 1. Since we know $Z_{Rm}$ is given by the resistor 27 and $Z_{RV}$ can be modelled as a resistor in parallel connection with a capacitor, where the reactance of the capacitor may be expressed as $$X_C = \frac{1}{\omega C_{RV}}$$

where $C_{RV}$ is the capacitance of the rotary valve 1, and $\omega$ is the angular frequency of the alternating electrical signal generated by the alternating electrical signal source 21.

the total impedance can then be expressed as $$Z_{TOT} = R_m + \frac{1}{R_{RV}\left(C_{RV}^2\omega^2 + \frac{1}{R_{RV}^2}\right)} - j\frac{C_{RV}\omega}{C_{RV}^2\omega^2 + \frac{1}{R_{RV}^2}}$$

where $R_M$ is the modifiable resistance of the resistor 27, and $R_{RV}$ is the resistance of the rotary valve 1. $R_M$ and $\omega$ are known values which in some cases may be modified if desired. Assuming the capacitance the rotary valve 1 can be modelled as a plate capacitor represented by vanes 15 and the housing 11 of the rotary valve 1, then $R_{RV}$ and $C_{RV}$ can be expressed as $$C_{RV} = \frac{\epsilon A}{d}, R_{RV} = \frac{\rho l}{A}$$

where $\epsilon$ is the permittivity of the material between the vanes 15 and the housing 11, A is the cross-sectional area between the vanes 15 and the housing, d is the distance between the vanes 15 and the housing 11, $\rho$ is the material resistivity of the rotary valve 1, and I is the length current travels through the rotary valve 1. Consequently, the total impedance $Z_{TOT}$ is dependent on the geometry of the rotary valve 1 and the material within the rotary valve 1. Furthermore, the phase angle resulting from the total impedance may be expressed as $$\angle Z_{TOT} = \tan^{-1}\left(\frac{\Im\{Z_{TOT}\}}{\Re\{Z_{TOT}\}}\right)$$

Consequently, by determining a phase angle of an alternating electrical signal passing through the rotary valve 1 and the resistor 27, information is obtained regarding the material within the rotary valve and the geometry of the rotary valve 1. Although, the above electrical model and explanation have been described with a rotary valve in mind, the same analysis may be carried out, mutatis mutandis, on other powder handling devices. Such analysis may further take into account inductive effects. The determined phase angle may also be used for quantifying the impedance of the rotary valve 1. The quantified impedance may then give further information regarding the geometry of the powder handling device and material being processed by the powder handling device. Furthermore, the phase angle resulting from the total impedance may be modified by the conditioning means, e.g. modifying the modifiable resistance of the resistor 27, thus allowing for enhanced signals by modifying measuring range and optimizing sensitivity.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. Sensor system for monitoring a powder handling device, wherein the sensor system comprises:
    an alternating electrical signal source electrically connectable to the powder handling device and configured to generate an alternating electrical signal,
    a processing device comprising a measuring device and a controller communicatively connectable to the measuring device, wherein the measuring device is electrically connectable to the powder handling device, and the alternating electrical signal source, wherein the measuring device is configured to collect measurement data on an input signal and an output signal, wherein the input signal is the alternating electrical signal before it passes through the powder handling device, wherein the output signal is the alternating electrical signal after it has passed through the powder handling device, wherein the controller is configured to receive the measurement data from the measuring device and determine a phase difference between the input signal and the output signal based on the received measurement data,
    wherein the controller is further configured to, based on the phase difference, determine a condition of the powder handling device.

2. Sensor system according to claim 1, further comprising conditioning means, preferably a resistor with a predefined resistance, electrically connectable to the powder handling device and the alternating electrical signal source, wherein the output signal is the alternating electrical signal after it has passed through both the powder handling device and the conditioning means.

3. Sensor system according to claim 2, wherein the conditioning means are modifiable.

4. Sensor system according to claim 3, wherein the controller is operationally connectable to the conditioning means, and wherein the controller is configured to modify the conditioning means based on a comparison between the determined phase difference and a first threshold.

5. Sensor system according to claim 4, wherein the controller is further configured to:
    compare the phase difference to a second threshold, and
    output, based on the comparison, an operation signal.

6. Sensor system according to claim 1, wherein the controller is configured to determine an amplitude change between the input signal and the output signal based on the received measurement data.

7. Sensor system according to claim 6, wherein the controller is further configured to:
    compare the amplitude change to a third threshold, and
    output, based on the comparison, an operation signal.

8. Sensor system according to claim 1, wherein the alternating electrical signal source generates the alternating electrical signal with a predefined frequency and amplitude, and wherein the predefined frequency and amplitude is modifiable by the alternating electrical signal source.

9. Sensor system according to claim 1, wherein the powder handling device is a rotary valve comprising a rotor and a housing, wherein the rotor comprises a rotor shaft defining an axial direction and a radial direction, the rotor further comprises a plurality of vanes connected to the rotor shaft and extending radially from the rotor shaft, wherein the rotor shaft and the plurality of vanes are configured to rotate around a rotation axis parallel with the axial direction within the housing without contacting the housing.

10. Powder handling device comprising a sensor system according to claim 1.

11. Powder handling device according to claim 10, wherein the powder handling device is a rotary valve comprising a rotor and a housing, wherein the rotor comprises a rotor shaft defining an axial direction and a radial direction, the rotor further comprises a plurality of vanes connected to the rotor shaft and extending radially from the rotor shaft, wherein the rotor shaft and the plurality of vanes are configured to rotate around a rotation axis parallel with the axial direction within the housing without contacting the housing,
    wherein the alternating electrical signal source is electrically connected to the rotor and the housing, and
    wherein the measuring device is electrically connected to the rotor and the housing.

12. Powder handling device according to claim 11, wherein the rotor shaft is rotatably mounted to the housing by insulating bearings or insulating sleeves.

13. Method for monitoring a powder handling device, wherein the method comprises:
    providing a powder handling device according to claim 1,
    generating, by the alternating electrical signal source, the alternating electrical signal,
    collecting, by the measuring device, measurement data on the input signal and the output signal, and
    determining, by the controller, a phase difference between the input signal and the output signal.

14. Method according to claim 13, wherein the method is performed during operation of the powder handling device.

* * * * *